(12) United States Patent
Mauger et al.

(10) Patent No.: US 12,176,697 B2
(45) Date of Patent: Dec. 24, 2024

(54) SYSTEMS AND METHODS FOR ROUTING ELECTRICAL WIRING THROUGH AN AIRCRAFT STRUCTURE

(71) Applicant: ARCHER AVIATION, INC., San Jose, CA (US)

(72) Inventors: Michael Mauger, Blaine, WA (US); Simon Saenz Llano, Mountain View, CA (US); Naishadh Vasjaliya, Milpitas, CA (US); Sonny Pilger, Saint-Jerome (CA); Adam Ziemba, Morgan Hill, CA (US); Pedro Carleial, Los Altos Hills, CA (US); Andrija Bajovic, La Crescenta, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/189,537

(22) Filed: Mar. 24, 2023

(65) Prior Publication Data
US 2024/0322542 A1 Sep. 26, 2024

(51) Int. Cl.
*H02G 3/22* (2006.01)
*B64C 3/18* (2006.01)
*B64F 5/10* (2017.01)
*B64C 29/00* (2006.01)

(52) U.S. Cl.
CPC .............. *H02G 3/22* (2013.01); *B64C 3/187* (2013.01); *B64F 5/10* (2017.01); *B64C 29/0008* (2013.01)

(58) Field of Classification Search
CPC ...... H02G 3/22; B64C 3/187; B64C 29/0008; B64F 5/10
See application file for complete search history.

(56) References Cited

U.S. PATENT DOCUMENTS

| 11,878,793 | B2* | 1/2024 | Behzadpour | B64C 3/20 |
| 2008/0149761 | A1* | 6/2008 | Nakazawa | B64D 29/02 244/54 |
| 2015/0229115 | A1* | 8/2015 | George | H01R 13/65914 174/72 A |
| 2020/0331616 | A1 | 10/2020 | Didyk et al. | |
| 2021/0245890 | A1 | 8/2021 | Bellis | |
| 2022/0227475 | A1 | 7/2022 | McMillan | |
| 2022/0297850 | A1* | 9/2022 | Gilbertson | H02G 3/0406 |

OTHER PUBLICATIONS

International Search Report and Written Opinion of the International Search Authority in counterpart International Application No. PCT/US2024/021152 dated Jun. 19, 2024 (12 pages).

* cited by examiner

*Primary Examiner* — Valentina Xavier
(74) *Attorney, Agent, or Firm* — Finnegan, Henderson, Farabow, Garrett & Dunner, LLP

(57) ABSTRACT

The embodiments of the present disclosure provide an aircraft assembly. The aircraft assembly includes an aircraft structure comprising a component with a plurality of wire openings. A plurality of high voltage wires are disposed in the wire openings in the component such that each wire opening receives one high voltage wire, and the each wire opening has an opening size larger than a size of the one high voltage wire, the opening size being smaller than a size of a connector attached to an end of the one high voltage wire. The high voltage wires are installed in the wire openings before curing the aircraft structure.

25 Claims, 17 Drawing Sheets

SYSTEMS AND METHODS FOR ROUTING ELECTRICAL WIRING THROUGH AN AIRCRAFT STRUCTURE

TECHNICAL FIELD

This disclosure relates generally to routing electrical wiring interconnect system (EWIS) through an aircraft structure. More particularly, and without limitation, the present disclosure relates to routing high voltage wires through a plurality of openings in an aircraft structure, and methods of routing high voltage wires through the plurality of openings in the aircraft structure.

BACKGROUND

Aircraft engine functionality is critical for maintaining the stability and safety of the aircraft. It is best practice to avoid single points of failure, so that if one engine is impaired the other engines can continue normal operations while maintaining the stability of the aircraft. One potential single point of failure may be caused by closely installed or bundled high voltage wires connected to different engines. This is a single point of failure because a single localized incident could simultaneously damage the high voltage wires serving different engines. For example, a wire bundle containing multiple high voltage wires could be installed too close to an aircraft component, resulting in each wire experiencing chafe and an eventual electrical fault. Each of the electrical engines served by these high voltage wires could be disabled as a result. Therefore, it is important to route the high voltage wires separately and provide spacing between them to ensure a single localized incident doesn't result in the failure of multiple engines. However, the installation of multiple high voltage wires inside an enclosed aircraft structure can be labor intensive. Furthermore, some approaches to high voltage wire routing create wire chafe problems, interfere with other aircraft elements, and impact the strength of the aircraft.

The disclosed aircraft wing and method of manufacturing thereof solve the above problems by preinstalling high voltage wires in a plurality of openings through ribs before curing the upper skin of the aircraft. Installation while the upper skin is off allows for installing the wiring when the aircraft wing is open and accessible, reducing the time and effort involved in assembling the wiring. Furthermore, the direct path of the high voltage wires proximate the upper skin may help minimize wire chafing and may provide more space for batteries, wiring, and/or other elements within the wing. Additionally, the smaller openings in the ribs as described in this disclosure may provide for a stronger aircraft component that may be able to withstand higher stresses during flight.

SUMMARY

The present disclosure generally relates to routing electrical wiring interconnect system (EWIS), such as high voltage wires, through one or more aircraft structures in an aircraft assembly, such as an eVTOL aerial vehicle. As used herein, an aircraft structure may refer to one or more structural components of an aircraft, such as an eVTOL aerial vehicle, including, for example, a wing, a fuselage, a boom, a pylon, or a stabilizer of an aircraft. A wing may include an integrated wing, a left wing, and/or a right wing of an aircraft.

One aspect of the present disclosure is directed to an aircraft wing including a front spar, a rear spar, a plurality of ribs extending from the front spar to the rear spar, a lower skin, and an upper skin. The plurality of ribs may each include a plurality of wire openings. A plurality of high voltage wires may be disposed in the wire openings in the plurality of ribs such that each wire opening receives one high voltage wire, and the each wire opening may have an opening size larger than a size of the one high voltage wire, the opening size being smaller than a size of a connector attached to an end of the one high voltage wire. The high voltage wires may be installed in the wire openings before curing the upper skin onto the plurality of ribs.

In some embodiments, the plurality of wire openings on the each rib may be positioned along a length of the each rib proximate the upper skin. In other embodiments, the plurality of wire openings on the each rib may be spaced apart to maintain a predetermined separation between each of the high voltage wires. In some embodiments the high voltage wires may be configured to pass through a fuselage of an aircraft, through the plurality of openings on the plurality of ribs of the aircraft wing, and into a wing box of the aircraft wing.

In some embodiments, the aircraft wing may also comprise a plurality of interface connectors positioned between the aircraft wing and a fuselage of an aircraft, wherein the plurality of interface connectors may be configured to be coupled to the high voltage wires. In some embodiments the upper skin on the plurality of ribs may be cured a temperature in a range between about 115° C. and about 200° C. In some embodiments, the opening size may range between about 1.5 inches and about 2.5 inches. In some embodiments, the weight of one of the each rib ranges between about 5 lbs and about 10 lbs. In some embodiments, a distance between any two of the high voltage wires ranges between about 4 inches and about 30 inches.

Another aspect of the present disclosure is directed to a method of manufacturing an aircraft wing. The method may comprise assembling a front spar, a rear spar, and a plurality of ribs extending from the front spar to the rear spar onto a lower skin. Each rib in the plurality of ribs may include a plurality of wire openings configured to receive high voltage wires. Each wire opening may have an opening size larger than a size of one high voltage wire, the opening size being smaller than a size of a connector attached to an end of the one high voltage wire. The method may also comprise installing high voltage wires in the wire openings in the plurality of ribs, such that the each wire opening receives the one high voltage wire. The method may also comprise assembling an upper skin onto the plurality of ribs after installing the high voltage wires in the wire openings, and curing bonds between the front spar, the rear spar, the plurality of ribs, the lower skin, and the upper skin to form a final wing assembly.

In some embodiments, the method may further comprise forming the plurality of wire openings in the each rib along a length of the each rib proximate the upper skin. In some embodiments the method may further comprise forming the plurality of wire openings such that the wire openings are spaced apart from each other at a predetermined distance. In some embodiments, the method may further comprise wherein installing the high voltage wires in the wire openings further comprises: passing the high voltage wires through a fuselage of an aircraft, through the wire openings on the plurality of ribs of an aircraft wing, and into a wing box of the aircraft wing. In some embodiments, the method may further include wherein installing the high voltage wires in the wire openings further includes: installing the high voltage wires in an uncured composite aircraft wing, and curing the bonds between the front spar, the rear spar, the plurality of ribs, the lower skin, and the upper skin to form the final wing assembly with the high voltage wires inside the aircraft wing.

In some embodiments, the method may further include positioning a plurality of interface connectors between the aircraft wing and a fuselage of an aircraft, wherein the plurality of interface connectors are configured to be coupled to the high voltage wires. In some embodiments curing the bonds is performed at a temperature in a range between about 115° C. and about 200° C. In some embodiments, the opening size ranges between about 1.5 inches and about 2.5 inches. In some embodiments, a weight of the each rib ranges between about 5 lbs and about 10 lbs. In some embodiments a distance between any two of the high voltage wires ranges between about 4 inches and about 30 inches.

Another aspect of the present disclosure is directed to an aircraft assembly including an aircraft structure comprising a component with a plurality of wire openings. A plurality of high voltage wires may be disposed in the wire openings in the component such that each wire opening receives one high voltage wire, and the each wire opening has an opening size larger than a size of the one high voltage wire, the opening size being smaller than a size of a connector attached to an end of the one high voltage wire. The high voltage wires may be installed in the wire openings before curing the aircraft structure.

In some embodiments, the aircraft structure may be a wing and the component comprising the wire openings is a rib of the wing. In some embodiments the aircraft structure may be a fuselage and the component comprising the wire openings is a frame of the fuselage. Additionally and/or alternatively, the aircraft structure may be a fuselage and the component comprising the wire openings is a skin of the fuselage. In some embodiments, the aircraft structure may be a boom and the component comprising the wire openings is a skin of the boom. In some embodiments, the aircraft structure may be a stabilizer and the component comprising the wire openings is a rib of the stabilizer.

BRIEF DESCRIPTIONS OF FIGURES

DETAILED DESCRIPTION

Figure 1A:
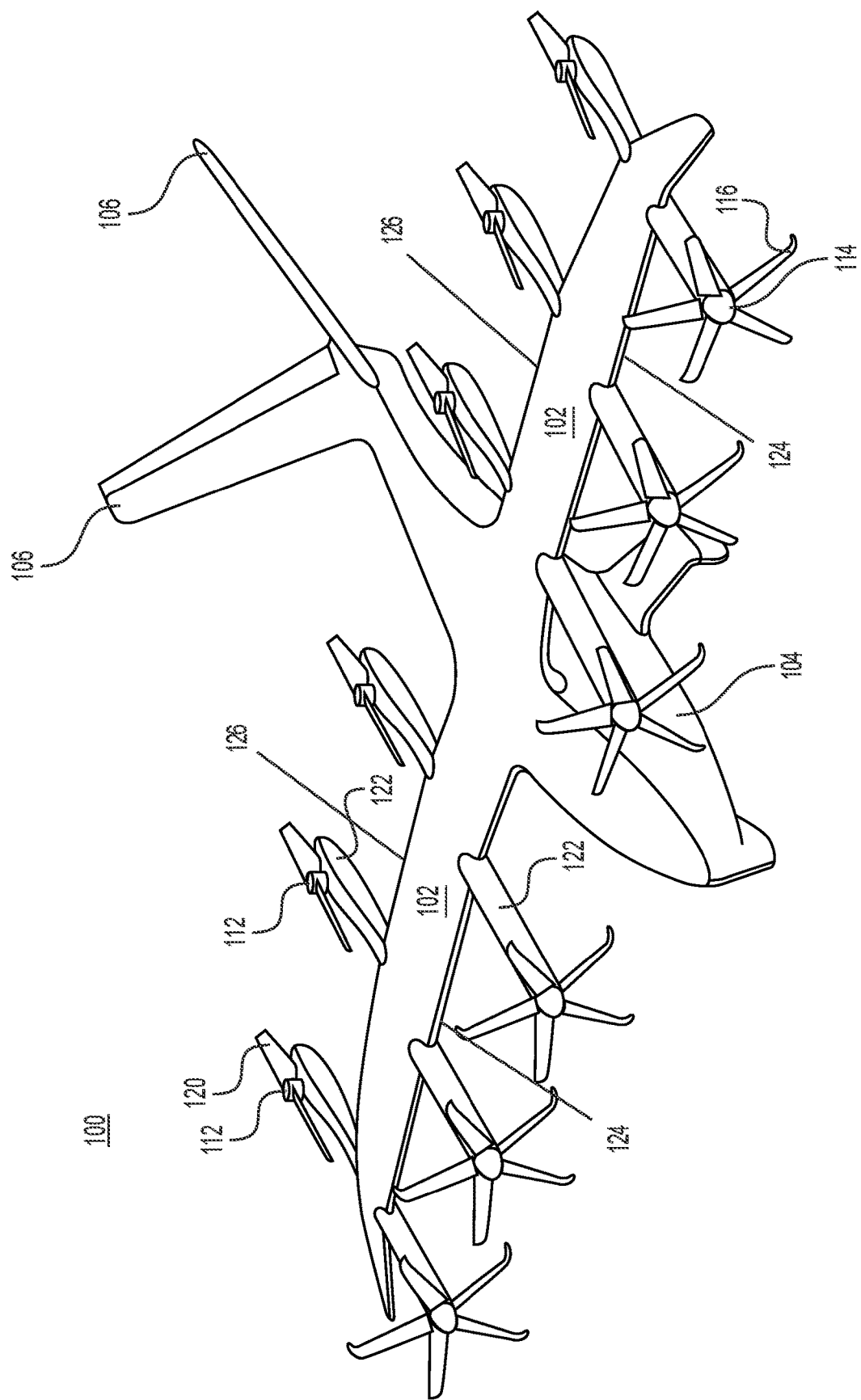
FIG. 1A illustrates an exemplary aircraft, consistent with the embodiments of the present disclosure.

Example embodiments are described herein with reference to the accompanying drawings. The Figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

Throughout this disclosure there are references to "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed Figure(s) for a description of the like element(s).

Various embodiments are described herein with reference to a structure, an assembly, or a method. It is intended that the disclosure of one is a disclosure of all. For example, it is to be understood that disclosure of a structure or an assembly described herein also constitutes a disclosure of methods for providing the structure or the assembly. It is to be understood that this form of disclosure is for ease of discussion only, and one or more aspects of one embodiment herein may be combined with one or more aspects of other embodiments herein, within the intended scope of this disclosure.

Figure 1B:
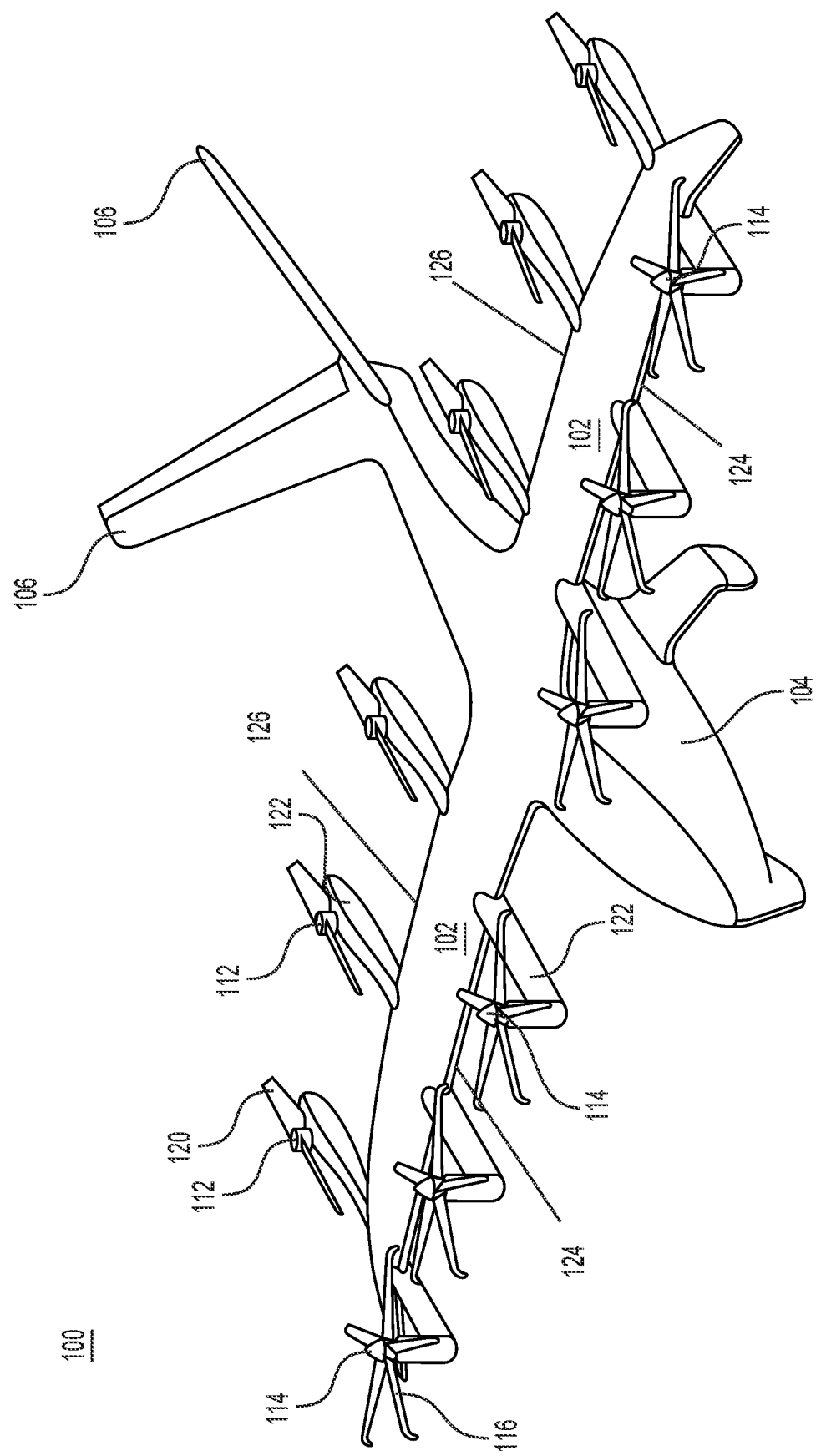
FIG. 1B illustrates another exemplary aircraft, consistent with the embodiments of the present disclosure.

FIG. 1A illustrates an eVTOL aircraft 100, consistent with the embodiments of the present disclosure. FIG. 1B illustrates another eVTOL aircraft 100, consistent with the embodiments of the present disclosure. Aircraft 100 may include a fuselage 104, wing 102 mounted to the fuselage 104, and one or more rear stabilizers 106 mounted to the rear of the fuselage 104. The fuselage 104 may comprise the aircraft's main body section and may hold crew, passengers, or cargo. The stabilizers 106 may provide longitudinal (pitch) and/or directional (yaw) stability. According to some embodiments, the rear stabilizers 106 may include control surfaces, such as one or more rudders, one or more elevators, and/or one or more combined rudder—elevators, movement of which may help to provide the longitudinal (pitch) and/or directional (yaw) stability.

The wings 102 may have any suitable design. In some exemplary embodiments, wing 102 may be an integrated wing that may include both a left wing 102 and a right wing 102. In other exemplary embodiments wing 102 may refer to a distinct left wing 102 and/or a distinct right wing 102. Booms 122 may be mounted beneath the wings 102, on top of the wings, and/or may be integrated into the wing profile. Booms 122 may connect rotors 112 and proprotors 114 to the wings 102 and/or fuselage 104.

A plurality of rotors 112 may be mounted to the one or more wings 102 and may be configured to provide lift for vertical take-off and landing. A plurality of proprotors 114 may be mounted to the one or more wings 102 and may be tiltable between a lift configuration, as shown in FIG. 1B, and a propulsion configuration, as shown in FIG. 1A. In a lift configuration, the proprotors 114 provide the lift required for vertical take-off and landing, and hovering. In a propulsion configuration, the proprotors 114 provide forward thrust for the aircraft. In some embodiments the rotors 112 are configured for providing lift only, with all propulsion being provided be the proprotors 114. When rotors 112 are configured to provide lift only, the rotors 112 may be in fixed positions.

In some exemplary embodiments, the rotors 112 may each have two blades 120. In other exemplary embodiments, the rotors 112 have more than two blades. In some exemplary embodiments, the proprotors 114 may include more blades than the rotors 112. For example, as illustrated in FIGS. 1A and 1i, the rotors 112 may each include two blades 120 and the proprotors 114 may each include five blades 116. According to various embodiments, the proprotors 114 may have from 2 to 5 blades. It is contemplated, however, that the rotors 112 and/or proprotors 114 may include any number of blades. The blades (120, 116) may have an airfoil-shaped cross section or any other cross-section that accommodates the lift and thrust requirements of the aircraft 100.

In some embodiments the aircraft 100 is an electrical aircraft (VTOL or eVTOL) and the rotors 112 and/or proprotors 114 include an electric motor driving the blades (120, 116) and a motor controller for controlling powering the motor. In some embodiments a battery pack may provide power to a collection of rotors 112 and/or proprotors 114. In some embodiments a battery pack may power a single rotor 112 or proprotor 114, or a portion of a single rotor 112 or proprotor 114. In some embodiments each rotor 112 and/or proprotor 114 may have its own associated battery pack. A "battery pack" may refer to any combination of electrically connected batteries (i.e. battery cells) and may include a plurality of batteries arranges in series, parallel or a combination of series and parallel.

In some embodiments, the rotors 112 and/or proprotors 114 may be powered by internal combustion engines (e.g. intermittent combustion or reciprocating engines). In some embodiments the rotors 112 and/or proprotors 114 may be powered by turbines (e.g. continuous combustion or continuous rotation engines). These various engines may be mounted to load bearing pylons on the wing 102. Additionally, or alternatively, the engines may be mounted elsewhere in the aircraft and high voltage electrical wiring may power the rotors 112 and/or proprotors 114. In various embodiments the power generation of the aircraft 100 may include any combination of power generation units, including batteries, turbine engines, internal combustion engines and/or any other type of machine that generates electrical power.

An electrical wiring interconnect system (EWIS) refers to a wiring scheme or arrangement for the aircraft and includes the high voltage cables for electrical power transmission to/from and between these various power generation units. As previously explained, it is critical to route aircraft high voltage wiring in a manner that provides spacing between the wires and avoids single points of failure. The Federal Aviation Administration (FAA) published an Aircraft EWIS Best Practices Job Aid which states that this separation/segregation is important to "isolate failure effects such that certain single failures that can compromise redundancy are minimized". In particular, the FAA notes that spacing between high voltage power feeders may be a primary factor in establishing compliance with the FAA rules.

As used herein the term "high voltage wire" may include a single wire or a high-voltage cable comprising multiple conductors. The high voltage wire may be used in alternating current (AC) or direct current (DC) power transmission. In some embodiments a high voltage wire may be associated with voltages ranging between 500 and 1,000 volts, and/or currents ranging between 50 and 250 amps.

The aircraft 100 depicted in FIGS. 1A and 1B includes a leading edge 124, which is a foremost edge of the aircraft wing 102, and a trailing edge 126, which is a rear edge of the aircraft wing 102. The structural components of the wing 102 are detailed in FIG. 11. Spars 1104 are the main structural member of the wing 102 and run spanwise, generally at right angles to the fuselage 104. The spars 1104 may carry flight loads and the weight of the wings 102. Ribs 1106 may be attached to the spars 1104 and may run generally parallel to the fuselage 104 and/or generally transverse to spars 1104. The ribs 1106 may provide support for the skin 1102 and help to transfer loads from the skin 1102 to the spars 1104. In some embodiments each wing 102 may include two spars 1104 and eight ribs 1106 between the spars. It is contemplated, however, that wing 102 may include any number of spars 1104 and/or ribs 1106. The below high voltage wire schemes are described with reference to wing components depicted in FIGS. 1A and 11.

Figure 2:
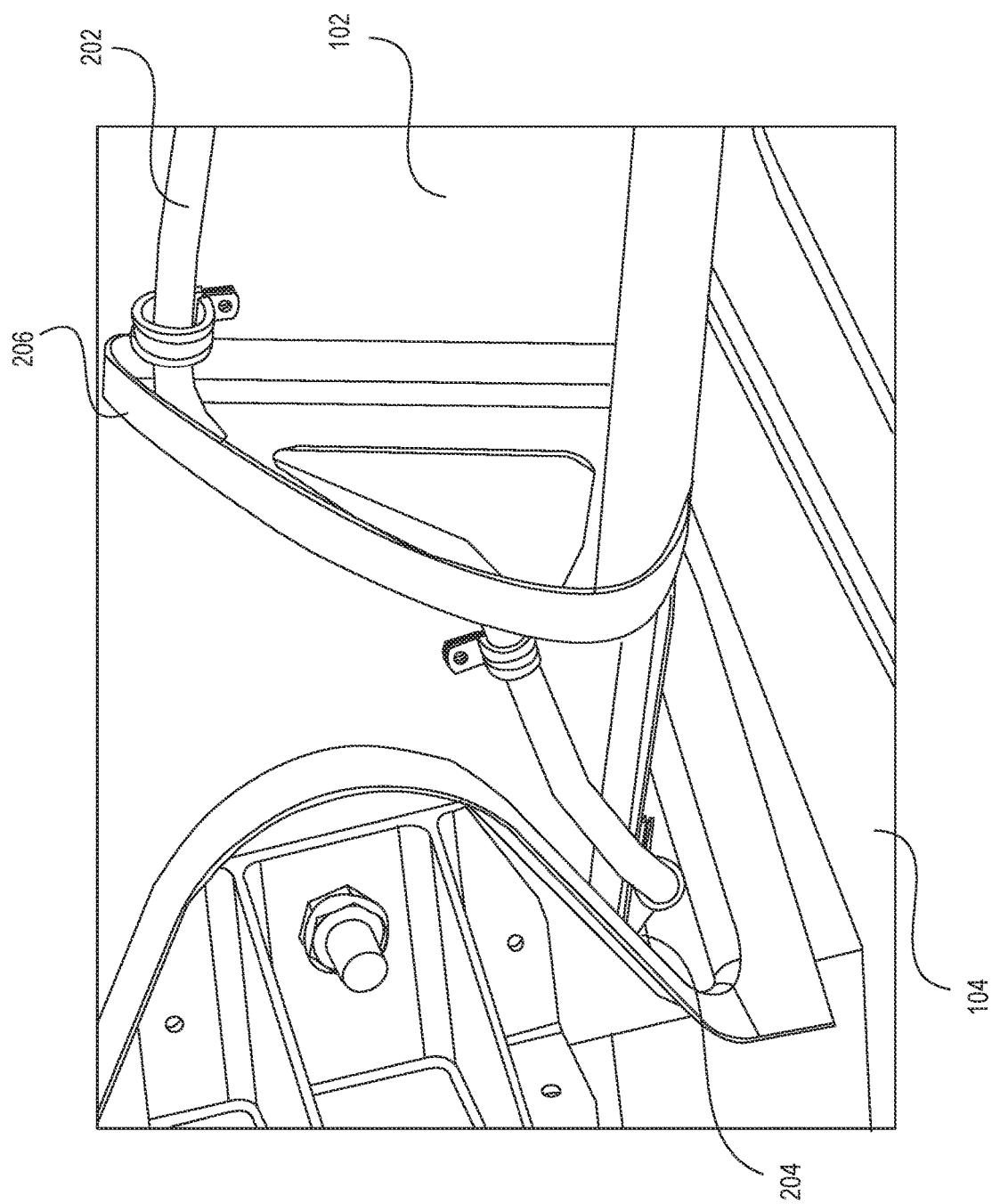
FIG. 2 illustrates an exemplary method of routing a high voltage wire through a leading-edge of an aircraft wing, consistent with the embodiments of the present disclosure.
Figure 5:
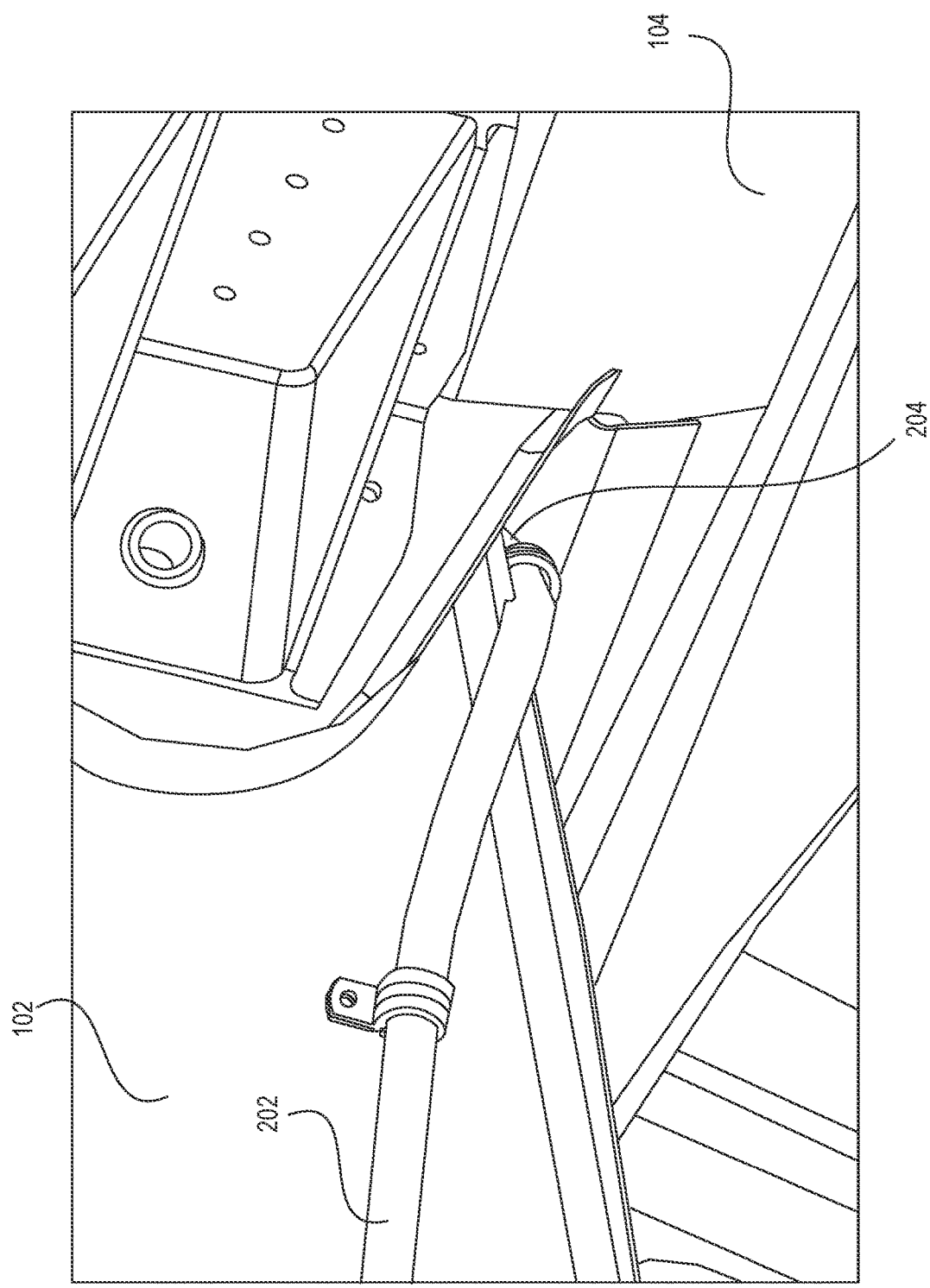
FIG. 5 illustrates a method of routing a high voltage wire through a trailing-edge of an aircraft wing, consistent with the embodiments of the present disclosure.

FIG. 2 illustrates one exemplary scheme for routing a high voltage wire 202 along a leading-edge 124 of an aircraft 100 outside of the front spar 1104 to fuselage joint area 204. Similarly, FIG. 5 depicts an exemplary scheme for routing high voltage wire 202 along a trailing-edge 126 of an aircraft outside of the rear spar 1104 into fuselage joint area 204. By routing the high voltage wires outside of the wing box 1110, these options may provide additional space in the wing box 1110. However, in the wiring schemes of FIGS. 2 and 5, high voltage wire 202 may be positioned between the wing 102 and fuselage 104. Furthermore, the wiring schemes of FIGS. 2 and 5 may require routing the high voltage wire 202 along complex curves around one or more aircraft components.

Figure 3:
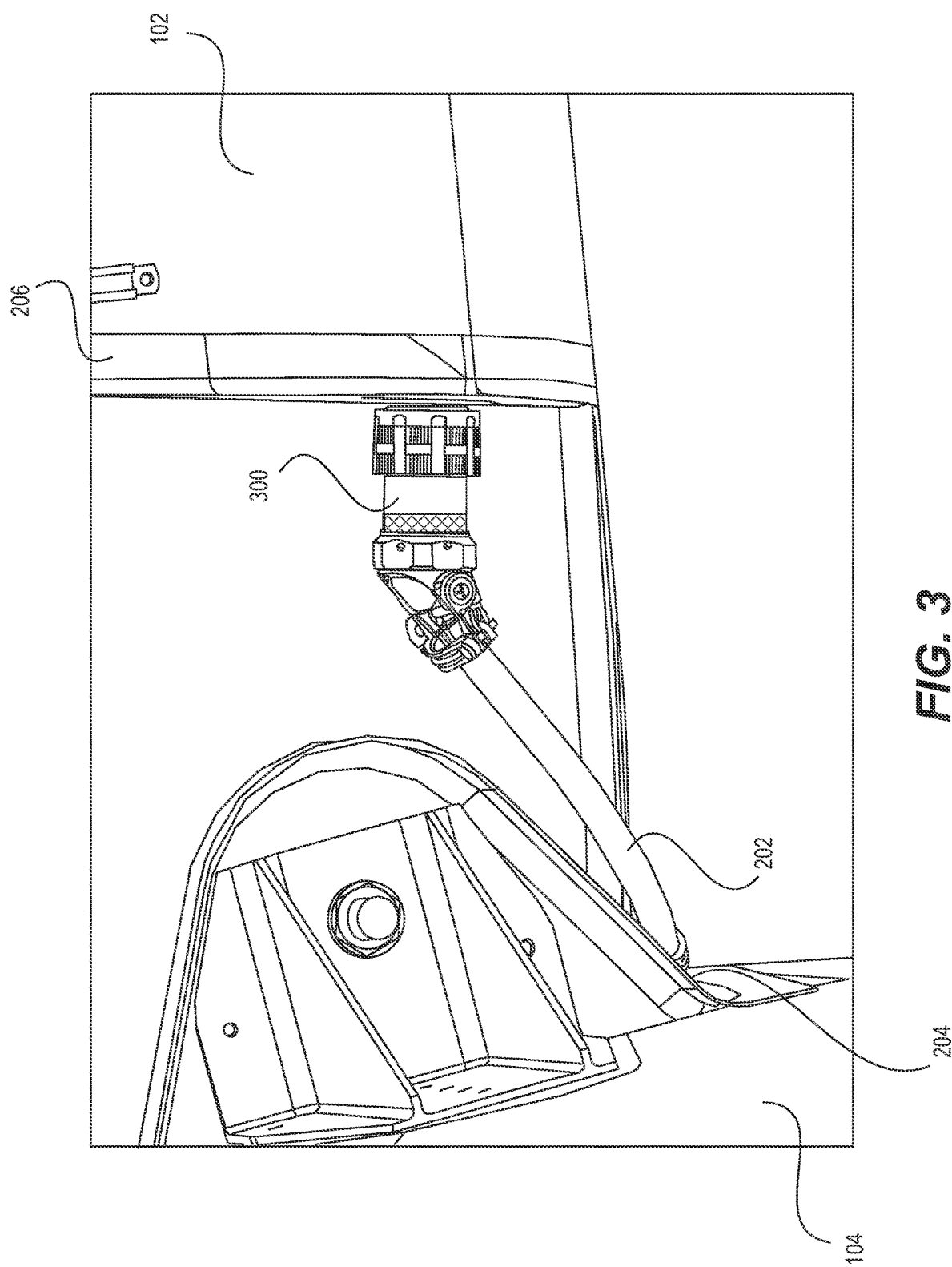
FIG. 3 illustrates an alternative method of routing a high voltage wire through a leading-edge of an aircraft wing, consistent with the embodiments of the present disclosure.
Figure 6:
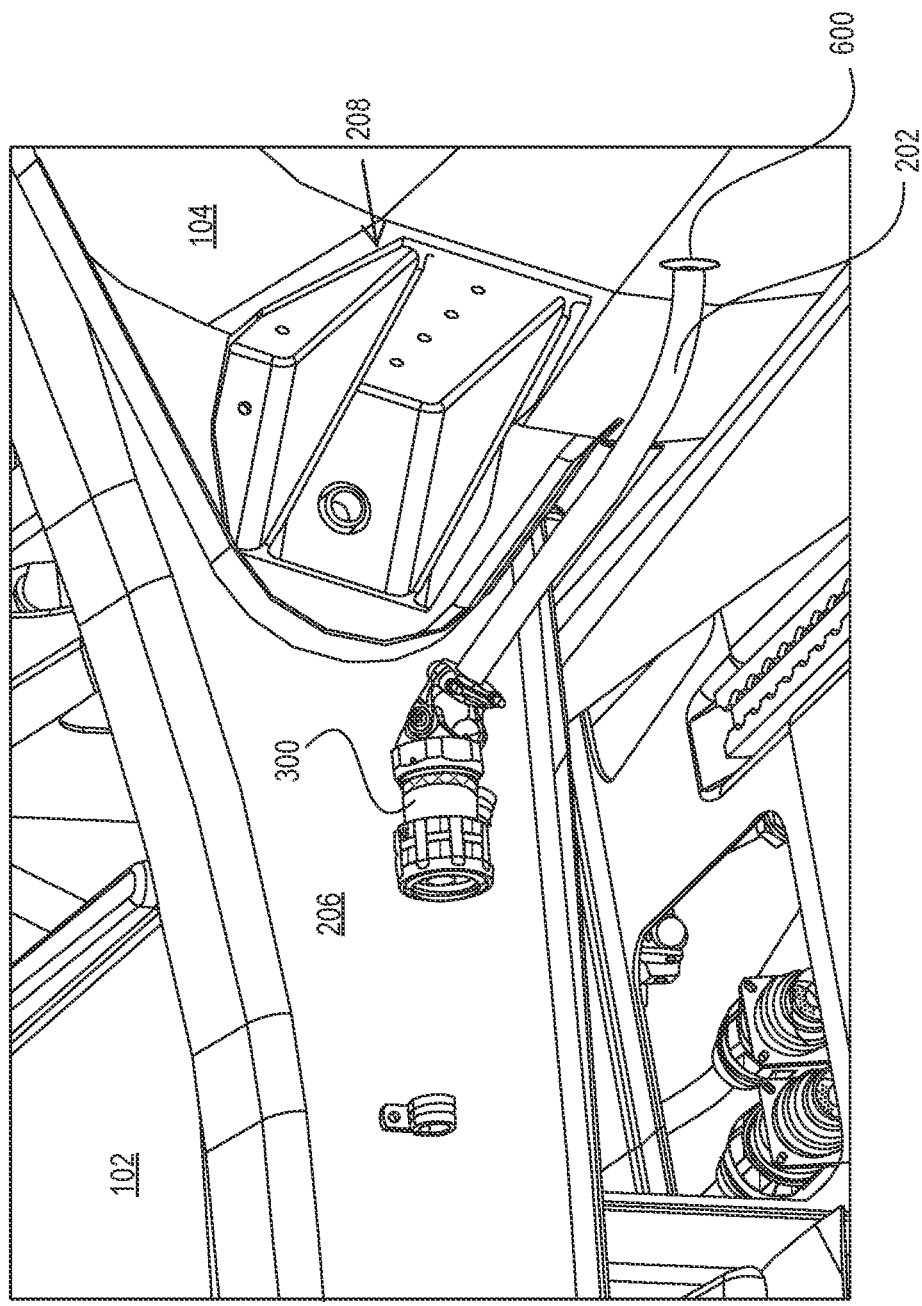
FIG. 6 illustrates an alternative method of routing a high voltage wire through a trailing-edge of an aircraft wing, consistent with the embodiments of the present disclosure.

FIG. 3 depicts an alternative option of using an interface connector 300 to separate the high voltage wire 202 in fuselage joint area 204 from the high voltage wire 202 that continues along the leading-edge of the wing 124. Similarly, FIG. 6 depicts a wiring scheme that provides an interface connector 300 to separate high voltage wire 202 routed into the fuselage 104 from the high voltage wire that continues along the trailing-edge of the wing 126. The interface connector may be a single-pin connector, multi-pin interface connector, an in-line connector or a panel mounted connector. Because it is located at the interface between the wing 102 and fuselage 104, the connector 300 may be rated to endure the environmental elements and should be moisture proof. FIG. 6 further depicts that, to avoid routing the high voltage wire 202 under the wing 102, a hole 600 may be added to the fuselage section 104 offset from the main structural attachment 208.

Figure 4:
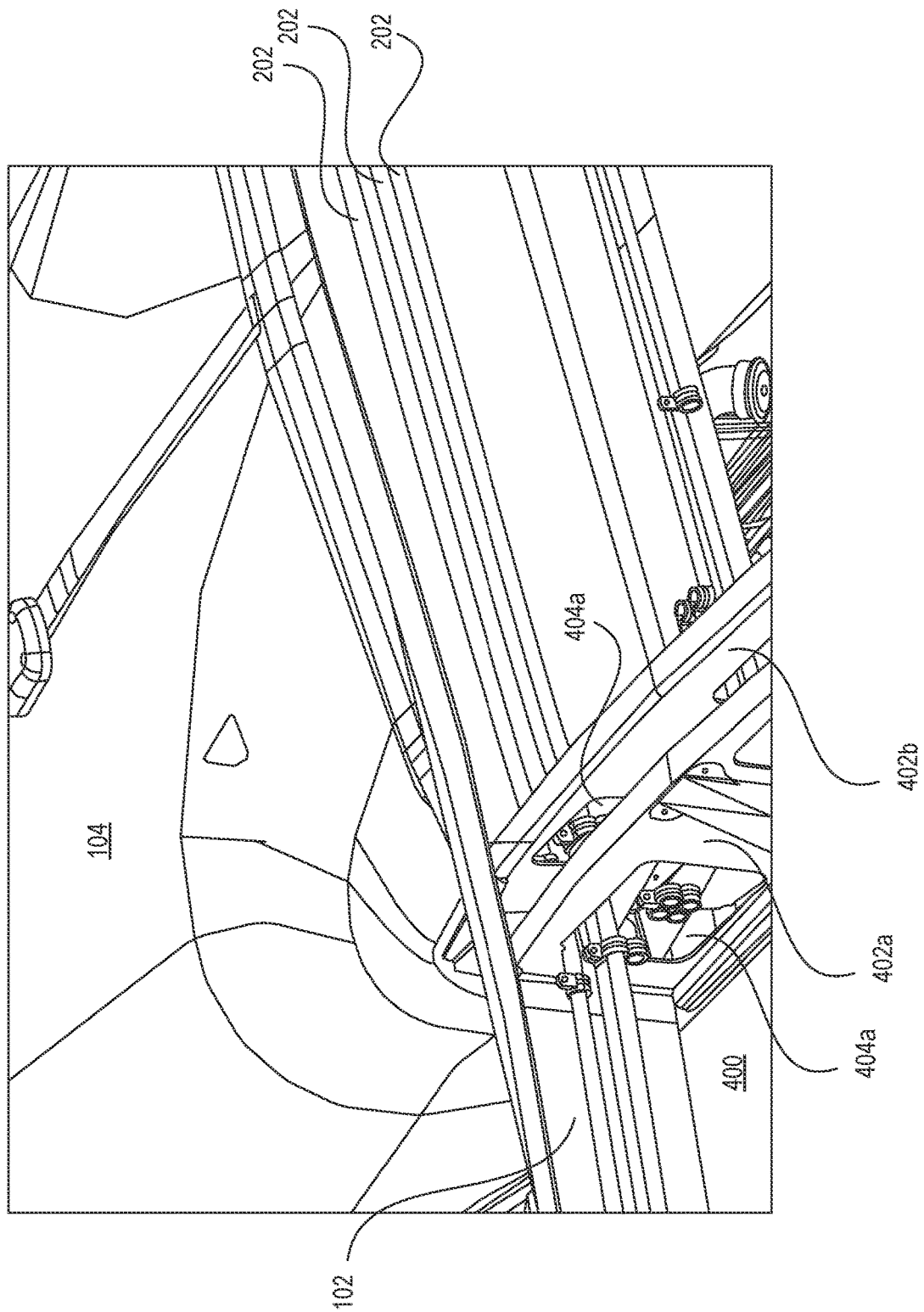
FIG. 4 illustrates another alternative method of routing a high voltage wire through a leading-edge of an aircraft wing, consistent with the embodiments of the present disclosure.
Figure 7:
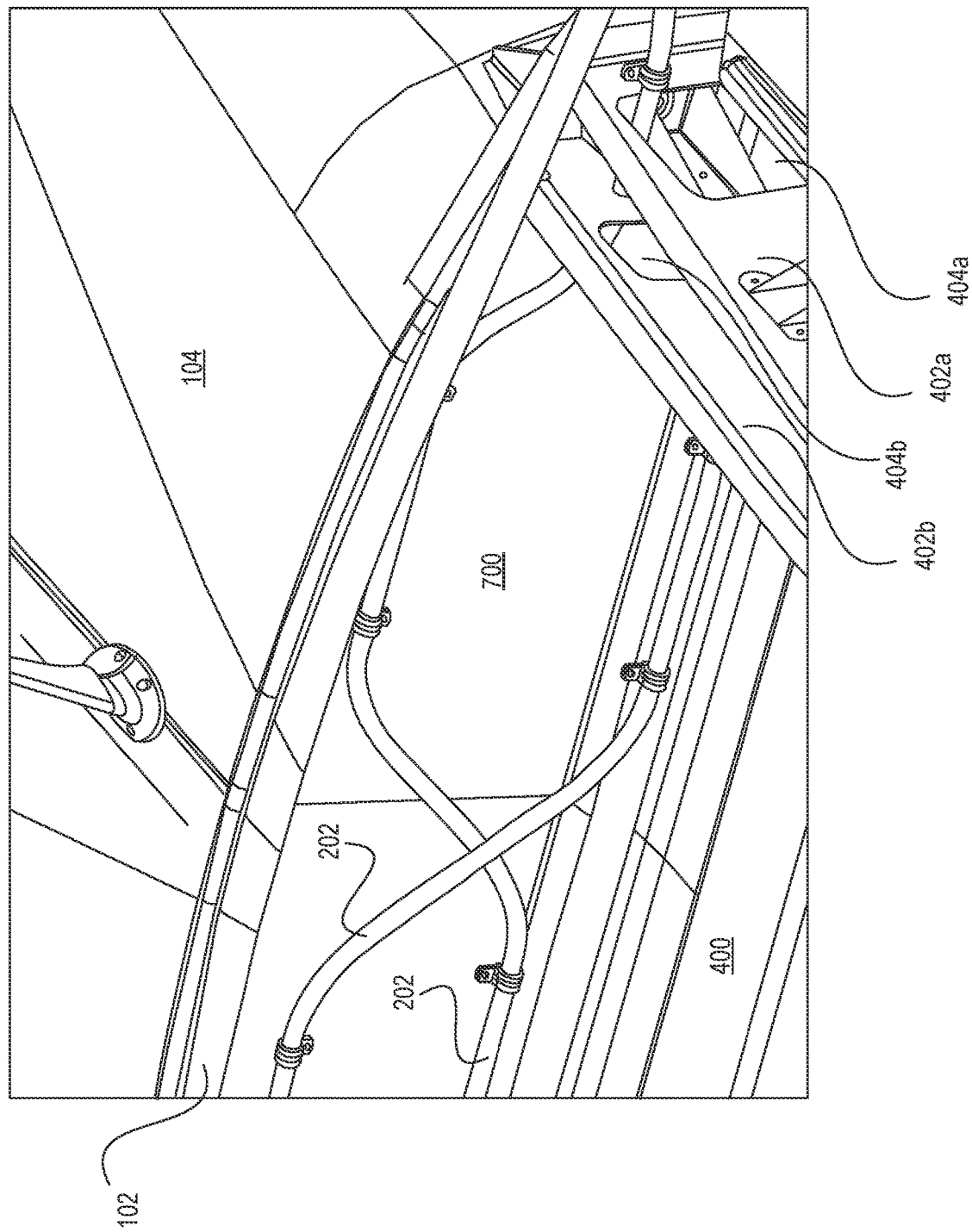
FIG. 7 illustrates another alternative method of routing a high voltage wire through a trailing-edge of an aircraft wing, consistent with the embodiments of the present disclosure.

FIG. 4 depicts another alternative option of routing the high voltage wire 202 through the openings 404*a-b* in ribs 402*a-b*. Doing so may provide for a direct path for high voltage wire 202 from the fuselage 104, through the ribs 402*a-b*, into the wing box 1110 where the high voltage wire continues along the leading-edge 124 of the aircraft 100. Similarly, FIG. 7 depicts an option of routing the high voltage wire 202 inside the wing box 1110 along the trailing-edge 126. In both options, the aircraft is enclosed prior to pulling the high voltage wire 202 and attached connector (e.g. connector 300 in FIG. 3) through the large openings 404*a-b* in the ribs 402*a-b*. These options provide for more direct routing of the high voltage wire 202 and avoid routing the high voltage wire 202 through the fuselage joint area 204.

Notably, the openings 404*a-b* in the ribs 402*a-b* must be large enough to accommodate feeding through the high voltage wires 202 and their attached connectors, such as connector 300 in FIG. 3. These large openings 404*a-b* may reduce the amount of stress that ribs 402*a-b* may be able to withstand during flight. To offset the reduced stress capacity, it may be possible to install thicker and stiffer ribs 402*a-b*, which may be heavier and may add to the weight of aircraft wing 102. The large openings 404*a-b* may be located between the upper skin and the lower skin and may encroach on the limited space available for installation of batteries and other wiring within wing 102.

Figure 8:
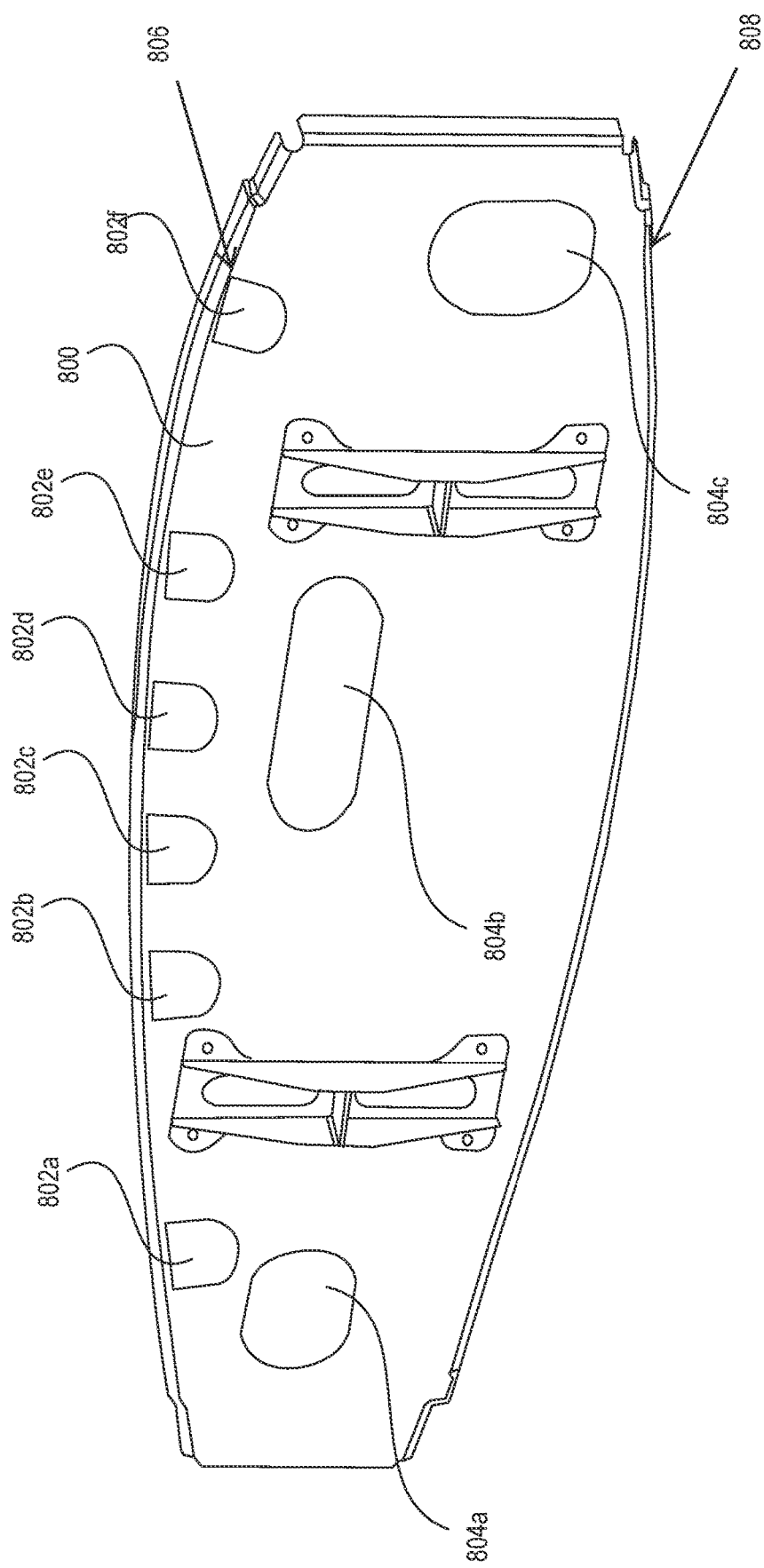
FIG. 8 illustrates an exemplary rib through which high voltage wires can be routed, consistent with the embodiments of the present disclosure.
Figure 11:
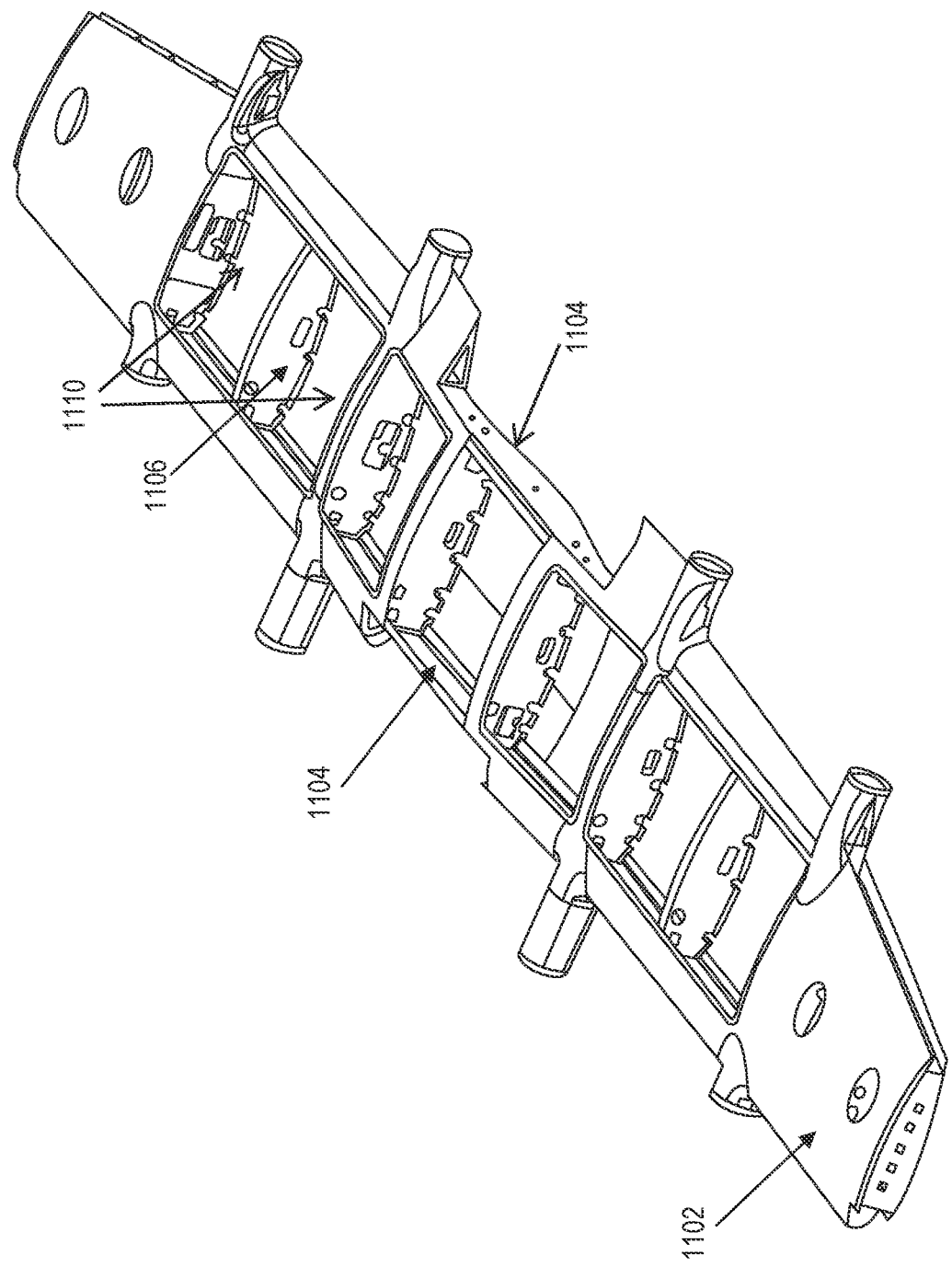
FIG. 11 illustrates an exemplary aircraft wing, consistent with the embodiments of the present disclosure.

An improved scheme for installing one or more high voltage wires 202 is shown in FIG. 8 which depicts a rib 800, such as the rib 1106 in FIG. 11, with smaller wire openings 802*a-f* disposed along an upper edge 806 of rib 800. Wire openings 802*a-f* may be large enough to accommodate high voltage wire 202 but may be smaller than outer dimensions of connector 300. Thus, wire openings 802*a-f* may be smaller than a size (e.g., outermost dimension, maximum width, or largest outer diameter) of connector 300 such that it may not be possible to pass or thread connector 300 through wire openings 802*a-f*.

Openings 802*a-f* may be created by stamping, cutting, milling, drilling or any other machining or manufacturing technique for creating cutouts, opening, or holes. Alternatively, the wire openings 802*a-f* may be created using a mold or formwork during the initial fabrication of the ribs 800 and the high voltage wire 202 may be installed through the wire opening prior to curing the rib. The wire openings may have various shapes. In some embodiments as illustrated in FIG. 8, the wire opening may be a U-shaped cutout along an edge of a rib 800. In some embodiments the wire openings may be circular, oval, square, rectangular, or asymmetrically shaped. The wire openings 802*a-f* may have any shape that accommodates high voltage wire 202.

In some exemplary embodiments, wire openings 802*a-f* may be disposed adjacent to or overlapping with upper edge 806 of rib 800. It is contemplated, however, that in other exemplary embodiments, wire openings 802*a-f* may be disposed adjacent to or overlapping with lower edge 808 of rib 800. High voltage wire 202 may be placed in the wire openings 802*a-f* without pulling through an attached connector 300. In another embodiment, the wire openings 802*a-f* may be disposed between upper edge 806 and lower edge 808 of rib 800. In this embodiment, the high voltage wire 202 may be passed through wire openings 802*a-f*, without pulling through an attached connector 300.

In some embodiments the wire openings 802*a-f* may be spaced apart along an upper edge 806 of a rib 800 as shown in FIG. 8. In other embodiments the wire openings 802*a-f* may be spaced along the lower edge 808 of rib 800. In other embodiments, the wire openings 802*a-f* may be spaced vertically along a leading-edge 124 of an aircraft 100 or along a trailing-edge 126 of an aircraft 100. The wire openings 802*a-f* may have any spacing orientation along the rib 800 as long as spacing is maintained between the high voltage wires 202.

The high voltage wire 202 may run through a fuselage 104 in an aircraft 100, through the plurality of wire openings 802*a-f*, and into a wing box 1110 of the aircraft wing 102. Unlike the circuitous routing through the fuselage joint area 204 in FIGS. 2 and 5, the more direct routing in FIG. 8 may help to reduce potential wire chaffing problems that may occur when wiring bends around various aircraft components. Interface connectors, such as interface connector 300 shown in FIGS. 3 and 6, may be installed to separate the high voltage wire 202 routed through the fuselage 104 from the high voltage wire 202 routed through the wing box 1110.

Each of the wire openings 802*a-f* may be spaced apart from another of the wire openings 802*a-f* to maintain a minimum separation between adjacently disposed high voltage wires 202. For example, a spacing between adjacent wire openings 802*a-f* may range from about 4 inches to about 30 inches. As used in this disclosure the terms about and generally should be interpreted to encompass dimensioning, machining, and manufacturing tolerances known in the art. Thus, for example, the phrase about 4 inches may include dimensions in the 4 inches ±0.5 inch range. Spacing apart high voltage wires 202 in this manner may increase aircraft safety and reliability by isolating incidents, such as wire chafing or abrasion. For example, by employing the scheme illustrated in FIG. 8, an aircraft component rubbing on one high voltage wire going through wire opening 802*a* would likely not impact another high voltage wire going through wire opening 802*b*.

In some exemplary embodiments, each wire opening 802*a-f* may be positioned along the length of the rib 800 proximate the upper skin 1102. This may result in more space in the wing box 1110 being available for installation of other elements, for example, low voltage wires running through wire openings 804*a-c* and/or batteries mounted on the rib 800. The uncongested wing box 1110 may make it easier to maintain good workmanship during installation of these elements and may help avoid damage to the elements or high voltage wires 202. The wiring scheme depicted in FIG. 8 and described above may also help to avoid interference between the low voltage and high voltage wire. Furthermore, it may provide for clearance between the other aircraft elements (e.g. batteries and low voltage wiring) and allow for easier maintenance and replacement.

As described above, in comparison to the large openings 404*a-b* in FIGS. 4 and 7, the wire openings 802*a-f* depicted in FIG. 8 may be much smaller because they do not need to accommodate routing both the high voltage wires 202 and attached connectors 300 through them. Instead, they may only need to accommodate the high voltage wires 202 which may be placed in the wire openings 802*a-f* prior to the installation of the upper skin 1102. Each wire opening 802*a-f* may only need to be slightly larger than the high voltage wire 202. In some exemplary embodiments, the wire openings 802*a-f* may have a maximum width or diameter ranging between from about 1.5 inches to 2.5 inches. These smaller wire openings 802*a-f* may help to ensure that ribs 800 have a smaller area from which material has been removed, allowing rib 800 to withstand a higher level of stress during flight, adequately support the aircraft skin 1102, and aid load distribution to the spars 1104. Adequate loading distribution and ability to withstand higher stresses on the ribs 800 may improve the durability of the aircraft components and reduce the potential for structural damage.

Routing high voltage wires 202 through an enclosed aircraft may require the installation of multiple wire connectors, such as interface connector 300, between the ribs 800 to assist in the wire pulling and installation. However, when the high voltage wire 202 is preinstalled in wing 102, fewer or no connectors may be needed. Furthermore, these wire openings 802*a-f* may be small enough that a relatively thinner rib material may be used without sacrificing the structural strength of the rib. The thinner rib material may reduce the weight of the rib 800 and associated wing 102. For example, in some exemplary embodiments, the weight of rib 800 may range between about 5 lbs to about 10 lbs, wherein the term "about" may encompass weight variations of the order of +/−0.5 lb. A lighter aircraft may exhibit better flight characteristics and may have an improved efficiency.

Aircraft components, such as wings 102 and fuselages 104, may be made of various materials. In some exemplary embodiments, these components may be made of metals. For example, relatively lighter metals such as, aluminum or aluminum alloys may be used to construct wings 102 and/or fuselages 104. In some exemplary embodiments, wings 102 and fuselages 104 may be made of a composite material, which is a material made of two or more constituent materials. A composite material may be made by combining a base material matrix, epoxy or resin, and fibers into a mold and curing the composition at a high temperature. For example, the curing temperature may be 115° C. to about 200° C., wherein the term "about" may encompass temperature variations of the order of +/−0.1 degree. During the curing process the material is hardened based on the crosslinking of polymer chains. Composite materials have good tensile strength and resistance to compression, making them ideal for aircraft components. In manufacturing, these components may be assembled and undergo a second high temperature curing process. The elevated temperature may allow an adhesive between the components to cure and hold the components together. While most electrical wires used on an aircraft may not withstand these elevated temperatures, aircraft high voltage wire 202 may have a higher temperature rating. Therefore, the high voltage wire 202 may be able to withstand the high temperature of the curing process without damage. In some exemplary embodiments, high voltage wire 202 may withstand cure temperatures ranging from about 115° C. to about 200° C.

Figure 9:
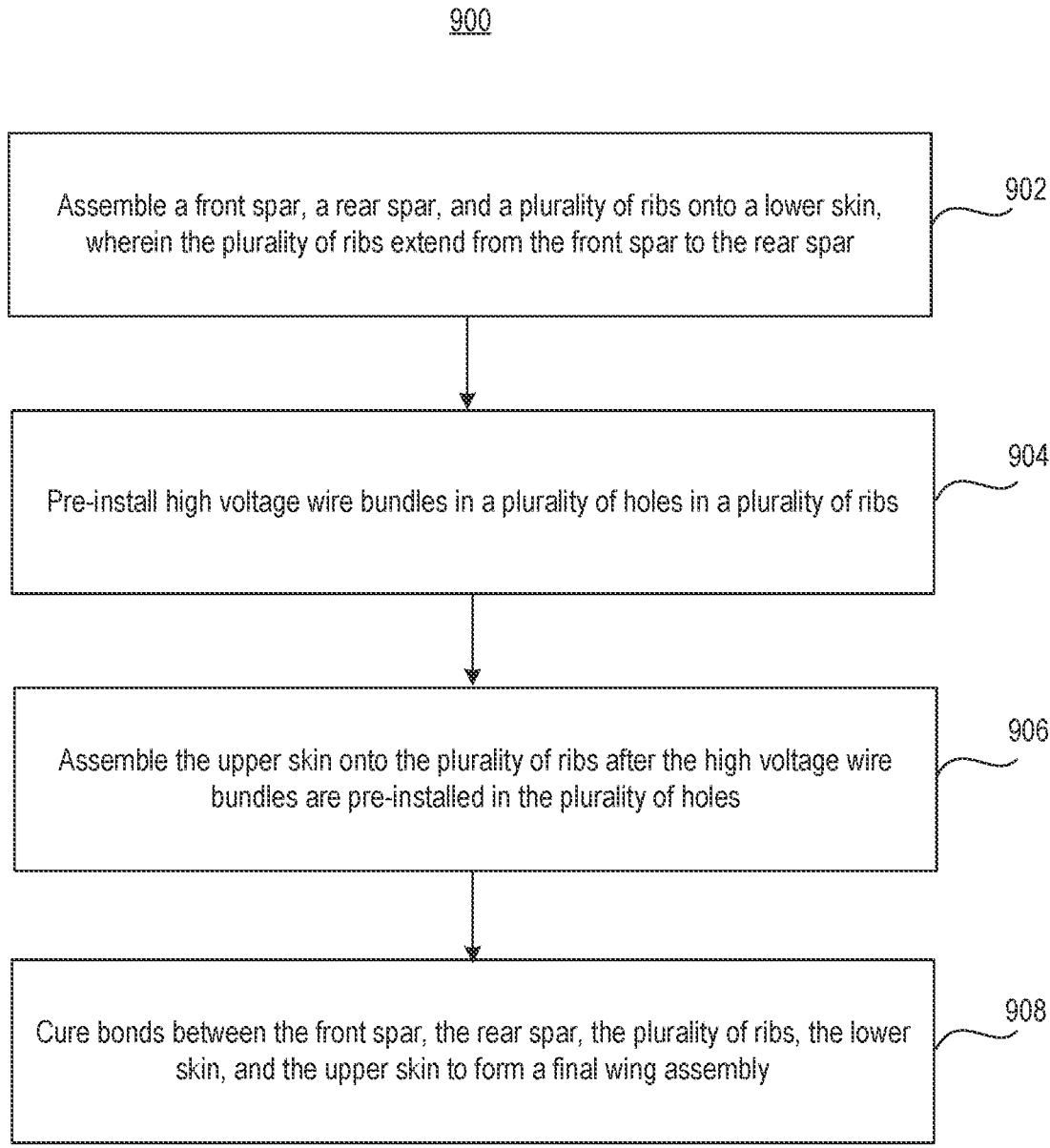
FIG. 9 illustrates an exemplary flow diagram of a method of manufacturing an aircraft wing, consistent with the embodiments of the present disclosure.
Figure 12:
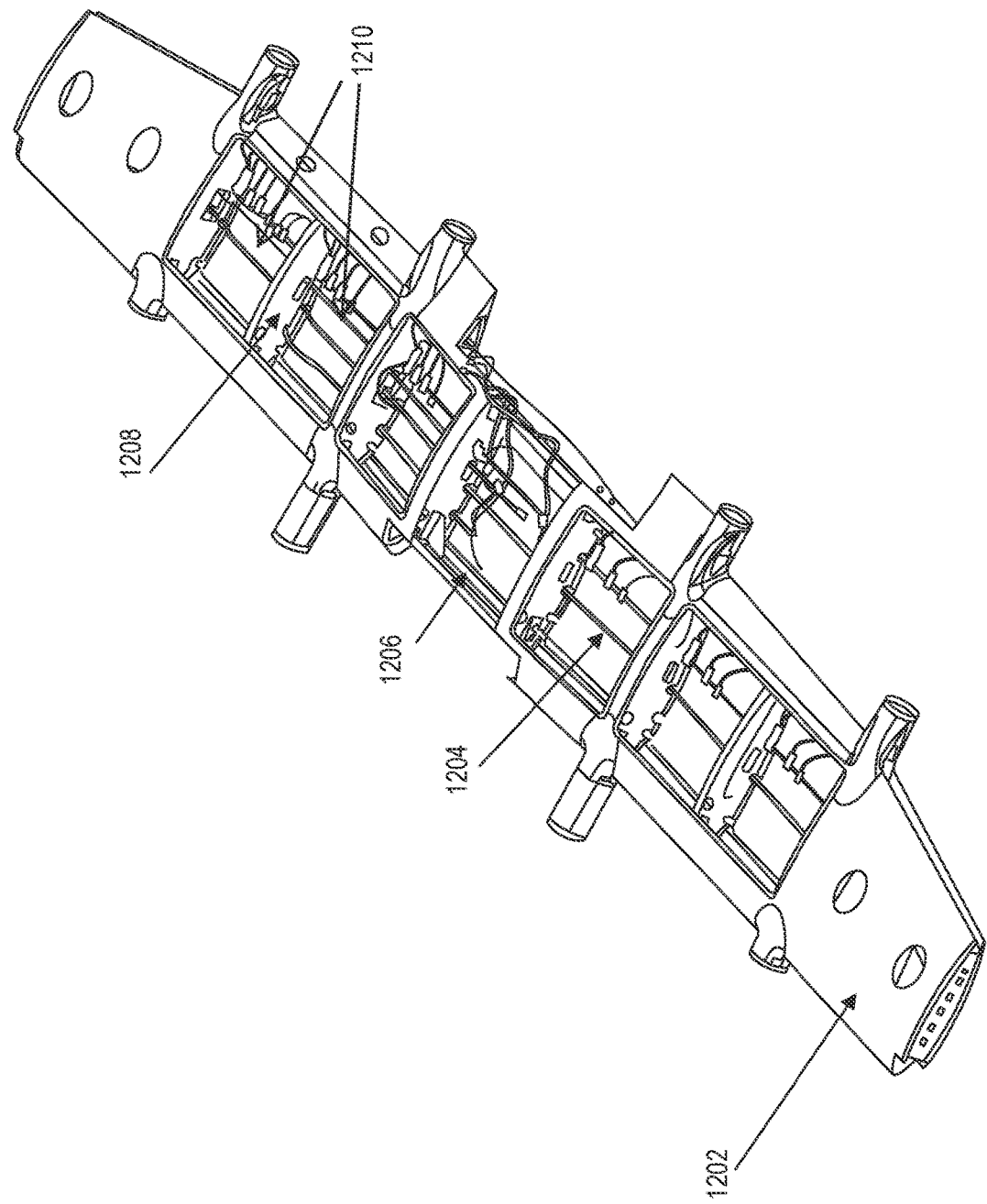
FIG. 12 illustrates an exemplary aircraft wing with a wire harness, consistent with the embodiments of the present disclosure.

A method 900 of manufacturing an aircraft wing with the above features is illustrated in FIG. 9, and the various aircraft wing components are shown in FIGS. 11-12. The order and arrangement of steps of method 900 is provided for purposes of illustration. As will be appreciated from this disclosure, modifications may be made to method 900 by, for example, adding, combining, removing, and/or rearranging the steps of method 900.

Method 900 may include a Step 902 of assembling the front and rear spars 1104, and ribs 1106 on a lower skin 1102. These components may be placed in a jig and held in place with clamps, fasteners, or clips. In some embodiments, spot welding, welding, brazing, or any other securing means may be used to hold the components together in a desired arrangement. In some embodiments an adhesive may be applied between any and/or all of the front and rear spars 1104, ribs 1106, and lower skin 1102. In some embodiments, an adhesive bond curing step may be used to attach the front and rear spars 1104 to ribs 1106, and/or to attach front and rear spars 1104 and ribs 1106 onto a lower skin 1102.

Method 900 may include a Step 904 of installing high voltage wires 202 in a plurality of wire openings, such as wire openings 802*a-f* in FIG. 8. In some embodiments installation may involve placing the high voltage wires 202 in the wire openings 802*a-f* and/or securing the high voltage wires prior to installing the upper skin 1202. As shown by FIG. 12, the high voltage wires 1204 may route from the fuselage 104, through the plurality of wire openings 802*a-f* in the rib, to the wing box 1210. The high voltage wires 202 may be spaced apart and may be substantially parallel to one another. The high voltage wires 202 may be secured prior to curing, using structural members to separate the wiring from the upper and lower skin 1202 during the curing process. Additionally, other securing devices, such as grommets, clamps, foam, and/or fasteners, may be used to secure the high voltage wire 202 to the structural members and/or the spars 1104 and ribs 1106 such that high voltage wire 202 is separated from and not in contact with upper and/or lower skin 1202. These securing devices may be rated to withstand the high temperature of the cure cycle. In some embodiments, these securing devices may withstand cure temperatures ranging from about 115° C. to about 200° C. These securing devices may provide temporary support for the high voltage wire 202 during the cure cycle and may be removed afterwards and/or these securing devices may provide permanent support for the high voltage wire 202.

Method 900 may include a Step 906 of assembling the upper skin 1202 onto the plurality of ribs with the high voltage wires 202 running through them. The high voltage wires 202 may be secured to avoid movement in the curing process. Assembling upper skin 1202 may include placing upper skin 1202 on the plurality of ribs 800 and/or on front and rear spars 1104. Assembling upper skin 1202 may also include attaching upper skin 1202 to some or all of ribs 800 and/or to front and rear spars 1104, using adhesives, fasteners, by tacking, welding, brazing, or using clamps or other fixtures to ensure the skin remains attached to ribs 800 and/or front and rear spars 1104 during the remainder of the assembly process.

Method 900 may include a Step 908 of curing the bonds between the front spar 1104, the rear spar 1104, the plurality of ribs 1106, the lower skin 1102 and the upper skin 1102 to form a final wing assembly. Curing may include placing the assembly of the front spar 1104, the rear spar 1104, the plurality of ribs 1106, the lower skin 1102 and the upper skin 1102 in an oven and subjecting the assembly to an elevated temperature to cure and harden adhesive material used to attach the various components to each other. In some embodiments, the elevated temperature during the curing process may range between about 115° C. to about 200° C. The final wing assembly may include the high voltage wires 202 running through the plurality of wire openings 802a-f in the plurality of ribs 1106, with the ribs now attached to the upper skin and the lower skin 1102. It is contemplated that connectors 300 may be attached to either end of each high voltage wire 202 after completing the final wing assembly to allow the high voltage wire 202 to be electrically connected to other high voltage wire segments in other portions of aircraft 100 or with other electrical components in aircraft 100.

While the above example embodiment describes the use of this high voltage wire assembly and method of manufacturing in the context of an aircraft wing, the disclosure is not so limited. High voltage wire may be run throughout an aircraft and separation between the high voltage wires may be necessary to avoid single points of failure. Therefore, different aircraft structures may comprise components that may incorporate a plurality of wire openings and high voltage wires may be preinstalled through these wire openings prior to curing the aircraft assembly. Furthermore, these other embodiments may achieve similar benefits to those achieved by the aircraft wing. Each embodiment may reduce labor in manufacturing and may provide additional space for other aircraft components. Below are a few examples of other embodiments within the scope of the present disclosure.

Figure 10:
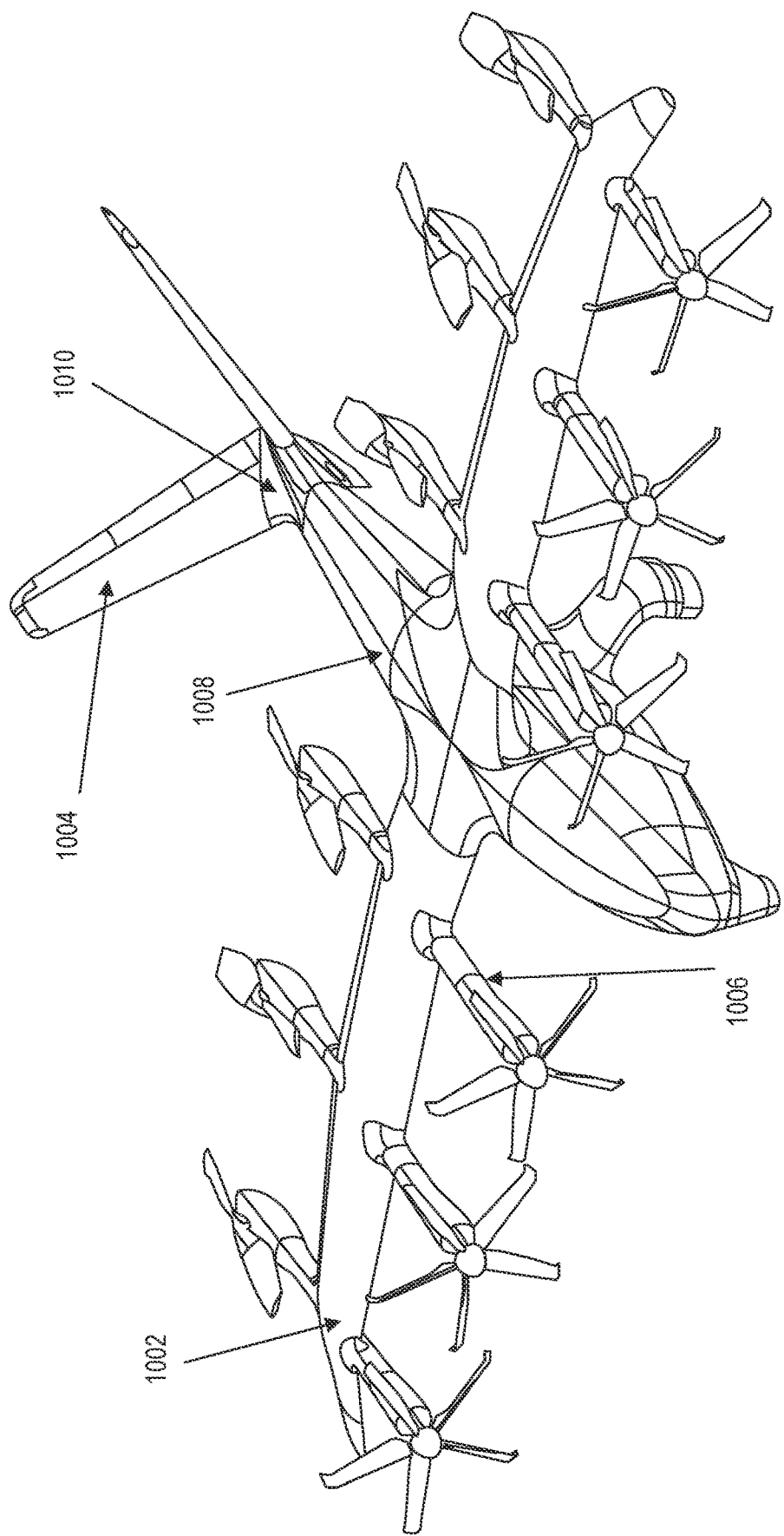
FIG. 10 illustrates an exemplary aircraft, consistent with the embodiments of the present disclosure.
Figure 13:
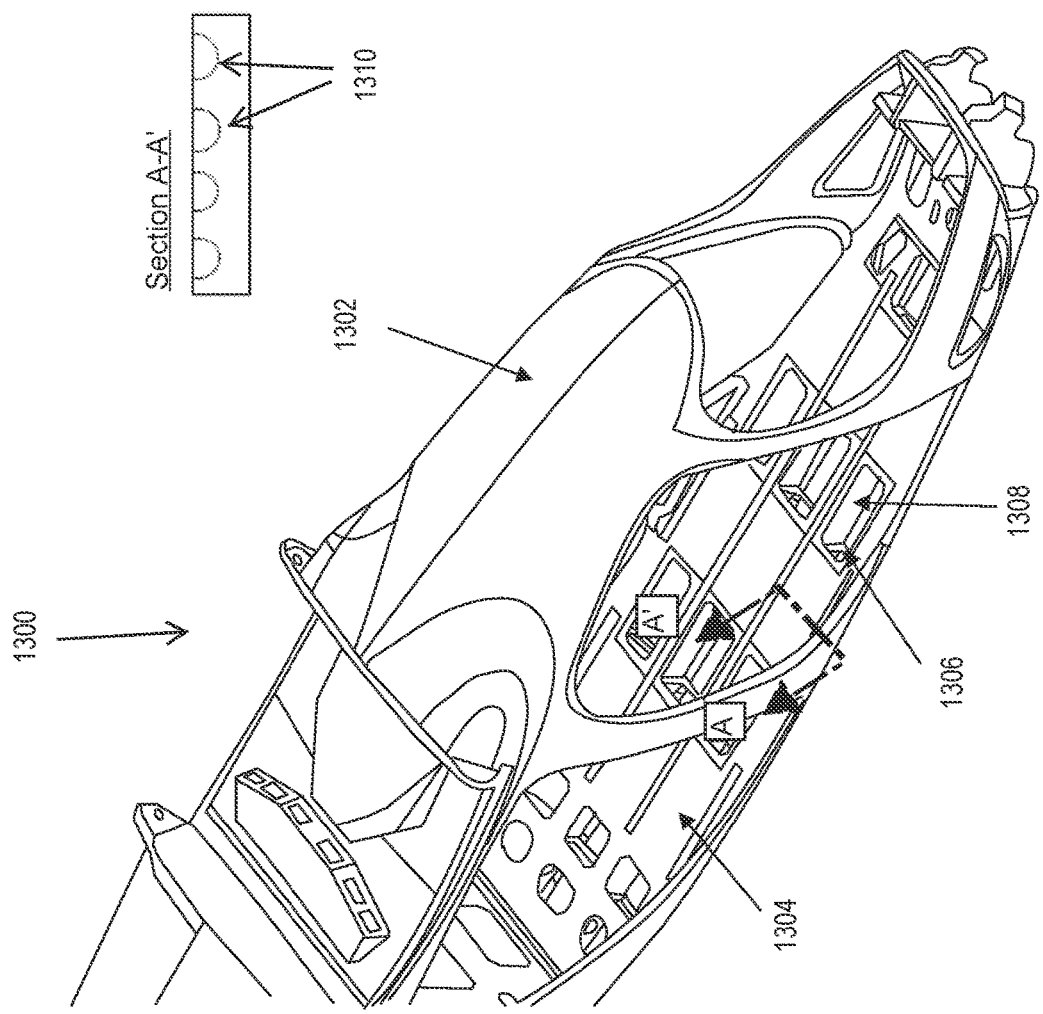
FIG. 13 illustrates an exemplary fuselage, consistent with the embodiments of the present disclosure.
Figure 14:
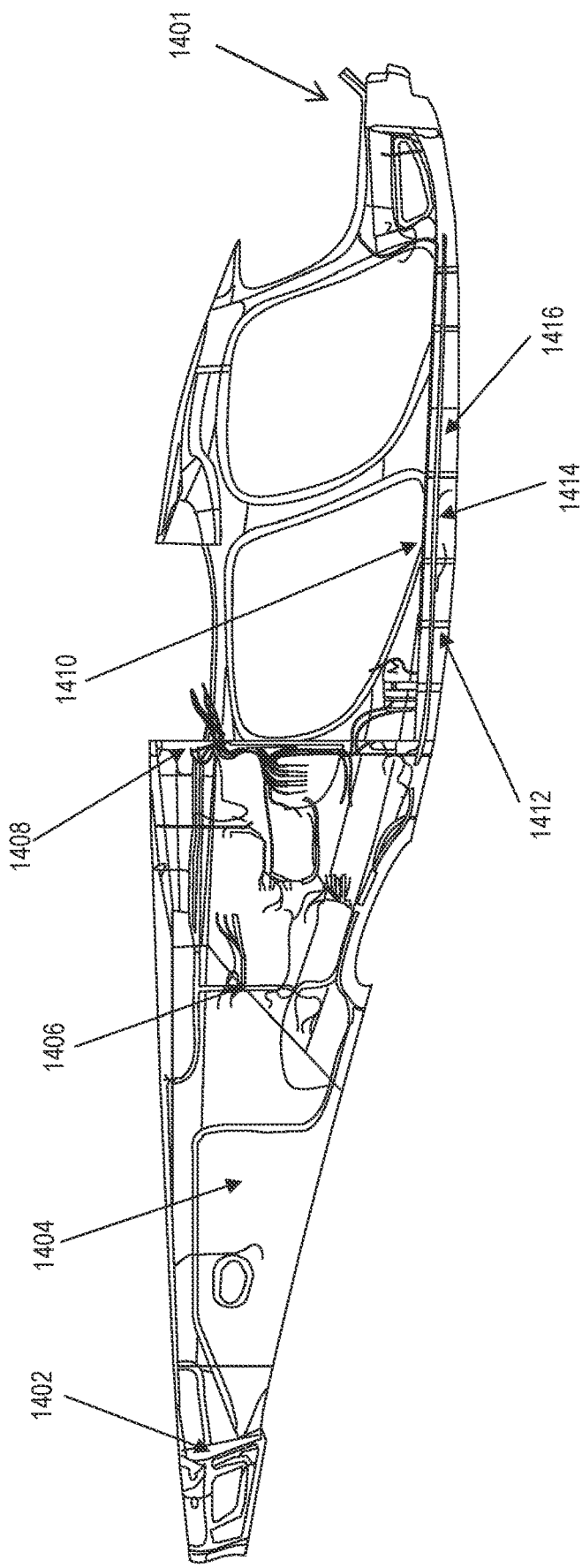
FIG. 14 illustrates an exemplary fuselage with wire harness, consistent with the embodiments of the present disclosure.

FIG. 13 depicts an exemplary embodiment of a fuselage 1300, such as fuselage 1008 in FIG. 10, with skin 1302, floor 1304, which provides a base for the interior of the aircraft, frame 1306, which provides a means for connection of the skin 1302, and longeron 1308 which helps support the aircraft load. Similar to the wire openings 802a-f in the rib depicted in FIG. 8, wire openings 1310 in the frame 1306 may allow for preinstallation of spaced high voltage wires prior to installation of skin 1302. As shown in FIG. 14, the high voltage wires 202 may be routed from the front of the fuselage 1401, through the wire openings 1310, towards the bulkhead 1402.

Figure 15:
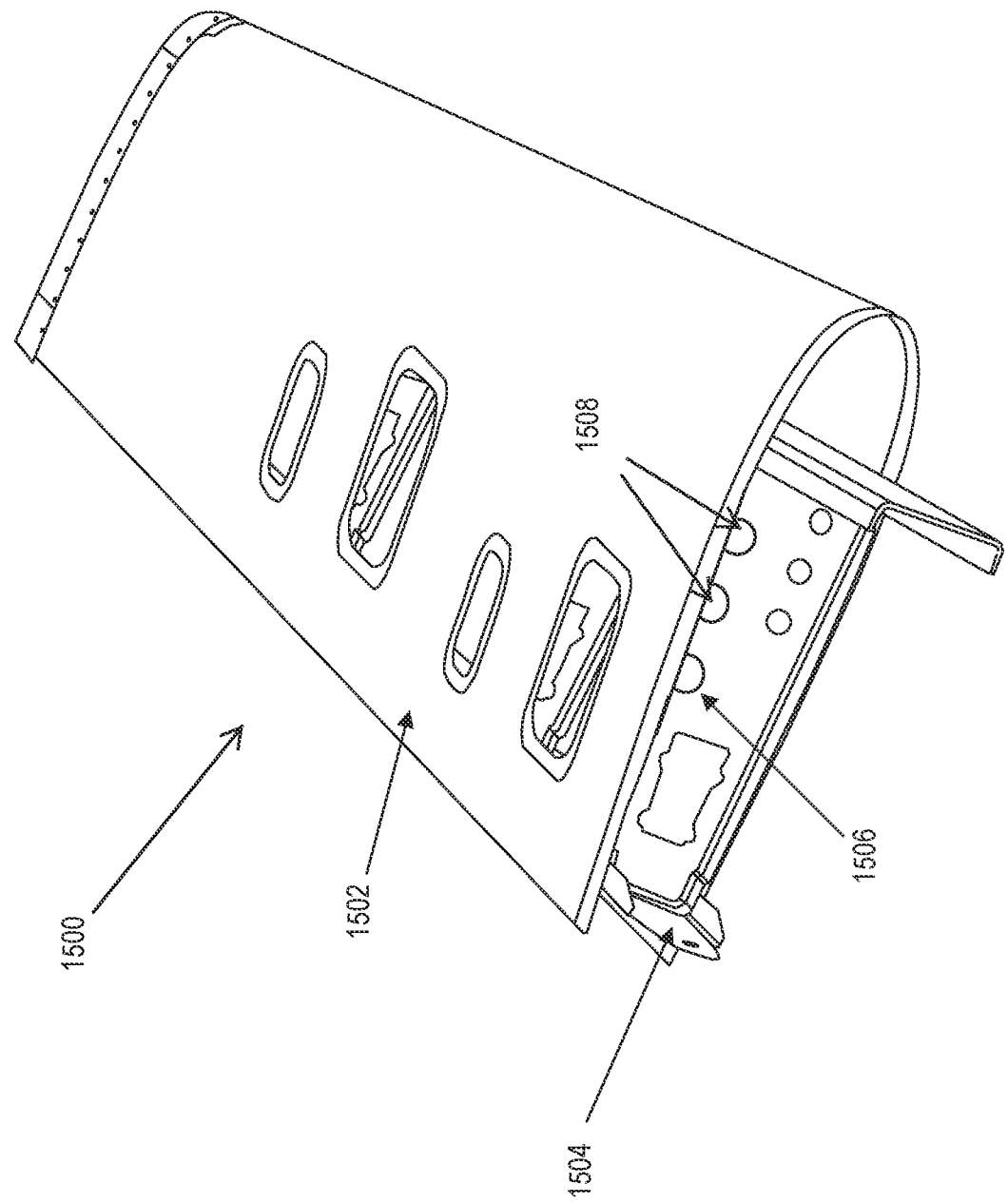
FIG. 15 illustrates an exemplary stabilizer, consistent with the embodiments of the present disclosure.

FIG. 15 depicts a stabilizer 1500, such as stabilizer 1004 in FIG. 10, with a spar 1504, rib 1506, and skin 1502. The stabilizer 1500 may provide longitudinal (pitch) and/or directional (yaw) stability. Similar to the wire openings 802a-f in the rib 800 depicted in FIG. 8, wire openings 1508 in the ribs 1506 may allow for the preinstallation of spaced high voltage wires, routed through the rib 1506 of the stabilizer 1500, prior to installation of the skin 1502.

Figure 16:
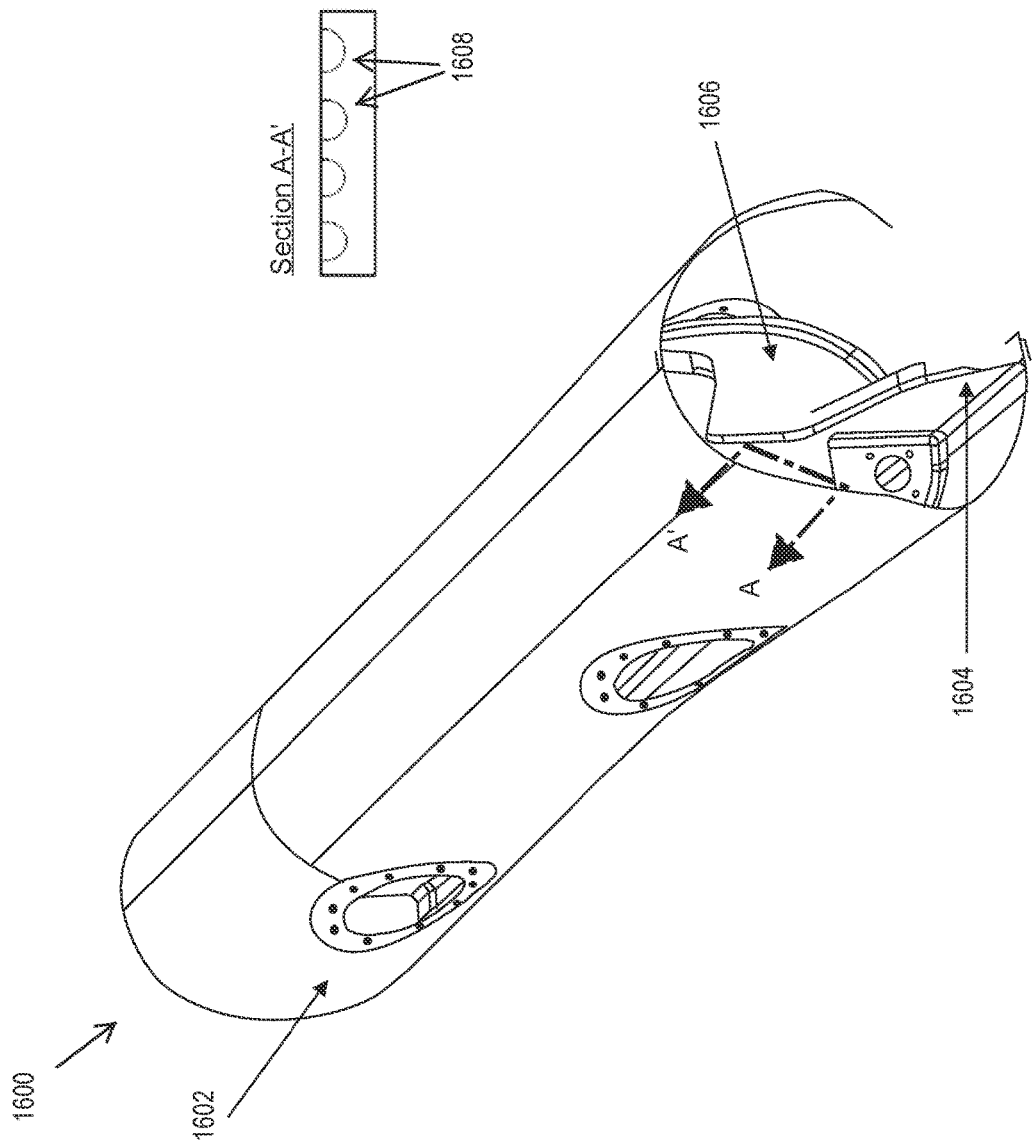
FIG. 16 illustrates an exemplary boom, consistent with the embodiments of the present disclosure.

FIG. 16 depicts a boom 1600, such as boom 1006 in FIG. 10, with an I-Beam 1604, bulkhead 1606, and skin 1602. The boom 1006 may provide a structural point of attachment from the wing to propulsion units, such as the rotors 112 or proprotors 114. Similar to the wire openings 802a-f in the rib 800 depicted in FIG. 8, wire openings 1608 in the bulkhead 1606 may allow for the preinstallation of spaced high voltage wires 202, routed through the boom 1600, prior to installation of the skin 1602.

While the above example embodiments are all aircraft structures, the disclosure is not so limited. In fact, the disclosure can be embodied in any structure that includes high voltage wire and cured skin. Various aircrafts, drones, land vehicles, and boats have structures that include high voltage wire and are comprised of cured composite components. These vehicle structures could incorporate the present disclosure and would see a benefit in doing so.

The foregoing description has been presented for purposes of illustration. It is not exhaustive and does not limit the disclosure to the precise forms or embodiments disclosed. Modifications and adaptations of the disclosure will be apparent to those skilled in the art from consideration of the specification and practice of the disclosed embodiments.

What is claimed is:

1. An aircraft wing, comprising:
a front spar;
a rear spar;
a plurality of ribs extending from the front spar to the rear spar, each rib including a plurality of wire openings,
a plurality of high voltage wires disposed in the wire openings in the plurality of ribs such that each wire opening receives one high voltage wire, and the each wire opening has an opening size larger than a size of the one high voltage wire, the opening size being smaller than a size of a connector attached to an end of the one high voltage wire;
a lower skin; and
an upper skin,
wherein the wire openings accommodate the high voltage wires being installed in the wire openings before curing the upper skin onto the plurality of ribs.

2. The aircraft wing of claim 1, wherein the plurality of wire openings on the each rib are positioned along a length of the each rib proximate the upper skin.

3. The aircraft wing of claim 1, wherein the plurality of wire openings on the each rib are spaced apart to maintain a predetermined separation between each of the high voltage wires.

4. The aircraft wing of claim 1, wherein the high voltage wires are configured to pass through a fuselage of an aircraft, through the plurality of openings on the plurality of ribs of the aircraft wing, and into a wing box of the aircraft wing.

5. The aircraft wing of claim 1, further comprising a plurality of interface connectors positioned between the aircraft wing and a fuselage of an aircraft, wherein the plurality of interface connectors are configured to be coupled to the high voltage wires.

6. The aircraft wing of claim 1, wherein curing the upper skin onto the plurality of ribs is performed at a temperature in a range between about 115° C. and about 200° C.

7. The aircraft wing of claim 1, wherein the opening size ranges between about 1.5 inches and about 2.5 inches.

8. The aircraft wing of claim 1, wherein a weight of one of the each rib ranges between about 5 lbs and about 10 lbs.

9. The aircraft wing of claim 1, wherein a distance between any two of the high voltage wires ranges between about 4 inches and about 30 inches.

10. A method of manufacturing an aircraft wing, the method comprising:
assembling a front spar, a rear spar, and a plurality of ribs onto a lower skin, wherein the plurality of ribs extend from the front spar to the rear spar, each rib in the plurality of ribs including a plurality of wire openings configured to receive high voltage wires,
wherein each wire opening has an opening size larger than a size of one high voltage wire, the opening size being smaller than a size of a connector attached to an end of the one high voltage wire;

installing high voltage wires in the wire openings in the plurality of ribs, such that the each wire opening receives the one high voltage wire;

assembling an upper skin onto the plurality of ribs after installing the high voltage wires in the wire openings; and curing bonds between the front spar, the rear spar, the plurality of ribs, the lower skin, and the upper skin to form a final wing assembly.

11. The method of claim 10, further comprising forming the plurality of wire openings in the each rib along a length of the each rib proximate the upper skin.

12. The method of claim 10, further comprising forming the plurality of wire openings such that the wire openings are spaced apart from each other at a predetermined distance.

13. The method of claim 10, wherein installing the high voltage wires in the wire openings further comprises:

passing the high voltage wires through a fuselage of an aircraft, through the wire openings on the plurality of ribs of an aircraft wing, and into a wing box of the aircraft wing.

14. The method of claim 10, wherein installing the high voltage wires in the wire openings further comprises:

installing the high voltage wires in an uncured composite aircraft wing; and curing the bonds between the front spar, the rear spar, the plurality of ribs, the lower skin, and the upper skin to form the final wing assembly with the high voltage wires inside the aircraft wing.

15. The method of claim 10, further comprising positioning a plurality of interface connectors between the aircraft wing and a fuselage of an aircraft, wherein the plurality of interface connectors are configured to be coupled to the high voltage wires.

16. The method of claim 10, wherein curing the bonds is performed at a temperature in a range between about 115° C. and about 200° C.

17. The method of claim 10, wherein the opening size ranges between about 1.5 inches and about 2.5 inches.

18. The method of claim 10, wherein a weight of the each rib ranges between about 5 lbs and about 10 lbs.

19. The method of claim 10, wherein a distance between any two of the high voltage wires ranges between about 4 inches and about 30 inches.

20. An aircraft assembly, comprising:

an aircraft structure comprising a component;

a plurality of wire openings in the component; and a plurality of high voltage wires disposed in the wire openings in the component such that each wire opening receives one high voltage wire, and the each wire opening has an opening size larger than a size of the one high voltage wire, the opening size being smaller than a size of a connector attached to an end of the one high voltage wire;

wherein the wire openings accommodate the high voltage wires being installed in the wire openings before curing the aircraft structure.

21. The aircraft structure of claim 20, wherein the aircraft structure is a wing and the component comprising the wire openings is a rib of the wing.

22. The aircraft structure of claim 20, wherein the aircraft structure is a fuselage and the component comprising the wire openings is a frame of the fuselage.

23. The aircraft structure of claim 20, wherein the aircraft structure is a fuselage and the component comprising the wire openings is a skin of the fuselage.

24. The aircraft structure of claim 20, wherein the aircraft structure is a boom and the component comprising the wire openings is a skin of the boom.

25. The aircraft structure of claim 20, wherein the aircraft structure is a stabilizer and the component comprising the wire openings is a rib of the stabilizer.

* * * * *